United States Patent
Ko et al.

(10) Patent No.: US 11,551,476 B2
(45) Date of Patent: *Jan. 10, 2023

(54) FACIAL VERIFICATION METHOD AND APPARATUS

(71) Applicant: Samsung Electronics Co., Ltd., Suwon-si (KR)

(72) Inventors: Minsu Ko, Suwon-si (KR); SeungJu Han, Seoul (KR); JaeJoon Han, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

This patent is subject to a terminal disclaimer.

(21) Appl. No.: 17/133,792

(22) Filed: Dec. 24, 2020

(65) Prior Publication Data

US 2021/0117657 A1 Apr. 22, 2021

Related U.S. Application Data

(63) Continuation of application No. 16/167,994, filed on Oct. 23, 2018, now Pat. No. 10,891,467.

(30) Foreign Application Priority Data

Nov. 10, 2017 (KR) .................. 10-2017-0149654

(51) Int. Cl.
*G06V 40/00* (2022.01)
*G06V 40/16* (2022.01)
(Continued)

(52) U.S. Cl.
CPC ......... *G06V 40/172* (2022.01); *G06K 9/6267* (2013.01); *G06N 3/08* (2013.01);
(Continued)

(58) Field of Classification Search
CPC ...... G06V 40/172; G06V 10/17; G06V 10/56; G06V 40/168; G06V 40/171;
(Continued)

(56) References Cited

U.S. PATENT DOCUMENTS 10,891,467 B2 * 1/2021 Ko ........................... G06T 5/50
2006/0285769 A1 12/2006 Wang et al.
(Continued)

FOREIGN PATENT DOCUMENTS

KR 10-2010-0034843 A 4/2010
KR 10-1129386 B1 3/2012
(Continued)

OTHER PUBLICATIONS

Korean Office Action dated Nov. 15, 2021, in counterpart Korean Patent Application No. 10-2017-0149654 (3 pages in English and 5 pages in Korean).

*Primary Examiner* — Michael R Neff
(74) *Attorney, Agent, or Firm* — NSIP Law

(57) ABSTRACT

A facial verification method includes separating a query face image into color channel images of different color channels, obtaining a multi-color channel target face image with a reduced shading of the query face image based on a smoothed image and a gradient image of each of the color channel images, extracting a face feature from the multi-color channel target face image, and determining whether face verification is successful based on the extracted face feature.

18 Claims, 10 Drawing Sheets

(51) Int. Cl.

| | | |
|---|---|---|
| *G06T 3/40* | (2006.01) | |
| *G06T 5/50* | (2006.01) | |
| *G06N 3/08* | (2006.01) | |
| *G06T 5/00* | (2006.01) | |
| *G06K 9/62* | (2022.01) | |
| *G06V 10/10* | (2022.01) | |
| *G06V 10/44* | (2022.01) | |
| *G06V 10/56* | (2022.01) | |

(52) U.S. Cl.
CPC ............ *G06T 3/4015* (2013.01); *G06T 5/002* (2013.01); *G06T 5/50* (2013.01); *G06V 10/17* (2022.01); *G06V 10/44* (2022.01); *G06V 10/56* (2022.01); *G06V 40/161* (2022.01); *G06V 40/168* (2022.01); *G06V 40/171* (2022.01)

(58) Field of Classification Search
CPC .... G06V 40/161; G06V 10/44; G06K 9/6267; G06N 3/08; G06T 3/4015; G06T 5/002; G06T 5/50
See application file for complete search history.

(56) References Cited

U.S. PATENT DOCUMENTS

| | | |
|---|---|---|
| 2011/0188713 A1 | 8/2011 | Chin et al. |
| 2012/0213419 A1 | 8/2012 | Kim et al. |
| 2014/0016863 A1 | 1/2014 | Saxena et al. |
| 2015/0042844 A1 | 2/2015 | Shu et al. |
| 2016/0360202 A1 | 12/2016 | Xu et al. |
| 2017/0186170 A1 | 6/2017 | Nugraha et al. |

FOREIGN PATENT DOCUMENTS

| | | |
|---|---|---|
| KR | 10-1352002 B1 | 1/2014 |
| KR | 10-1370514 B1 | 3/2014 |
| KR | 10-1515928 B1 | 5/2015 |
| KR | 10-2016-0061856 A | 6/2016 |
| KR | 10-2017-0018666 A | 2/2017 |
| KR | 10-1738278 B1 | 5/2017 |

\* cited by examiner

FACIAL VERIFICATION METHOD AND APPARATUS

CROSS-REFERENCE TO RELATED APPLICATIONS

This application is a continuation of U.S. patent application Ser. No. 16/167,994 filed Oct. 23, 2018, which claims the benefit under 35 USC 119(a) of Korean Patent Application No. 10-2017-0149654 filed on Nov. 10, 2017, in the Korean Intellectual Property Office, the entire disclosure of which is incorporated herein by reference for all purposes.

BACKGROUND

1. Field

The following description relates to facial verification technology.

2. Description of Related Art

Facial verification technology is a type of biometrics-based authentication technology, and used to determine whether a user is a valid user based on a face in a still image or a video. The facial verification technology may verify a target, e.g., a face of a user, without contact with the target. Recently, the facial verification technology has been used in a wider range of application fields, such as, for example, security systems, mobile verification, and multimedia search, due to convenience and efficiency of the facial verification technology.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a facial verification method includes separating a query face image into color channel images of different color channels; obtaining a multi-color channel target face image with a reduced shading of the query face image based on a smoothed image and a gradient image of each of the color channel images; extracting a face feature from the multi-color channel target face image; and determining whether face verification is successful based on the extracted face feature.

The obtaining of the multi-color channel target face image with the reduced shading may include obtaining a target face image corresponding to each of the color channels based on the smoothed image and the gradient image of each of the color channel images, thereby obtaining target face images respectively corresponding to the color channels; and obtaining the multi-color channel target face image by combining the target face images respectively corresponding to the color channels.

The obtaining of the target face image corresponding to each of the color channels may include generating a reconstructed image in which edges are emphasized for each of the color channels based on the smoothed image and the gradient image of each of the color channel images; and generating the target face image corresponding to each of the color channels by fusing each of the color channel images with the reconstructed image for each of the color channels based on a weight parameter for each of the color channels.

The weight parameter for each of the color channels may determine a degree of fusion between each of the color channel images and the reconstructed image for each of the color channels.

The weight parameter for each of the color channels may be a predefined constant.

The weight parameter for each of the color channels may be determined based on a result of image quality assessment (IQA) performed on the query face image.

The weight parameter for each of the color channels may be determined for each of the color channel images by a neural network configured to receive image data of the query face image as an input.

The weight parameter for each of the color channels may be determined for each pixel location in each of the color channel images by a neural network configured to receive image data of the query face image as an input.

The generating of the reconstructed image may include obtaining the smoothed image of each of the color channel images by performing smoothing on each of the color channel images; obtaining a first gradient image of each of the color channel images in a horizontal direction and a second gradient image of each of the color channel images in a vertical direction from each of the color channel images; normalizing each of the first gradient image and the second gradient image based on the smoothed image; and generating the reconstructed image corresponding to each of the color channel images based on the normalized first gradient image and the normalized second gradient image.

The extracting may include extracting the face feature using a neural network configured to receive image data of the multi-color channel target face image with the reduced shading of the query face image as an input.

The separating may include separating the query face image into color channel images of red, green, and blue (RGB) color channels.

In another general aspect, a non-transitory computer-readable medium stores instructions that, when executed by a processor, cause the processor to perform the facial verification method described above In another general aspect, a facial verification apparatus includes a processor configured to separate a query face image of a user into color channel images of different color channels; obtain a multi-color channel target face image with a reduced shading of the query face image based on a smoothed image and a gradient image of each of the color channel images; extract a face feature of the user from the multi-color channel target face image; and determine whether face verification is successful based on the extracted face feature.

The processor may be further configured to obtain a target face image corresponding to each of the color channels based on the smoothed image and the gradient image of each of the color channel images, thereby obtaining target face images respectively corresponding to the color channels; and obtain the multi-color channel target face image by combining the target face images respectively corresponding to the color channels.

The processor may be further configured to generate a reconstructed image in which edges are emphasized for each of the color channels based on the smoothed image and the gradient image of each of the color channel images; and generate the target face image corresponding to each of the color channels by fusing each of the color channel images with the reconstructed image for each of the color channels based on a weight parameter for each of the color channels.

The weight parameter for each of the color channels may be a predefined constant.

The weight parameter for each of the color channels may be determined for each of the color channels by a neural network configured to receive image data of the query face image as an input.

The weight parameter for each of the color channels may be determined for each pixel location in each of the color channel images by a neural network configured to receive image data of the query face image as an input.

In another general aspect, a facial verification method includes separating a query face image into color channel images of different color channels; generating a multi-color channel target face image in which an effect of variations in an illumination environment in which the query face image was obtained is reduced based on the color channel images; and determining whether face verification is successful based on the multi-color channel target face image.

The generating of the multi-color channel target face image may include generating an enhanced image in which an image characteristic is enhanced for each of the color channels from the color channel image of a corresponding one of the color channels; generating a target face image for each of the color channels by fusing each of the color channel images with the enhanced image for a corresponding one of the color channels, thereby obtaining target face images respectively corresponding to the color channels; and obtaining the multi-color channel target face image by combining the target face images respectively corresponding to the color channels.

The image characteristic that is enhanced in the enhanced image may include edges of the color channel image of a corresponding one of the color channels.

The generating of the enhanced image may include generating a gradient image for each of the color channels from the color channel image of a corresponding one of the color channels; and generating the enhanced image for each of the color channels based on the gradient image for a corresponding one of the color channels.

The generating of the enhanced image may include generating a smoothed image for each of the color channels from the color channel image of a corresponding one of the color channels; generating a gradient image for each of the color channels from the color channel image of a corresponding one of the color channels; and generating the enhanced image for each of the color channels by normalizing the gradient image for a corresponding one of the color channels based on the smoothed image for a corresponding one of the color channels.

The fusing may include fusing each of the color channel images with the enhanced image for a corresponding one of the color channels based on a weight parameter for a corresponding one of the color channels, and the weight parameter may determine how strongly the target face image is influenced by each of the color channel image and the enhanced image.

The weight parameter may depend on the illumination environment, and may cause the target face image to be more strongly influenced by the color channel image than the enhanced image for a desirable illumination environment, and to be more strongly influenced by the enhanced image than the color channel image for an undesirable illumination environment.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
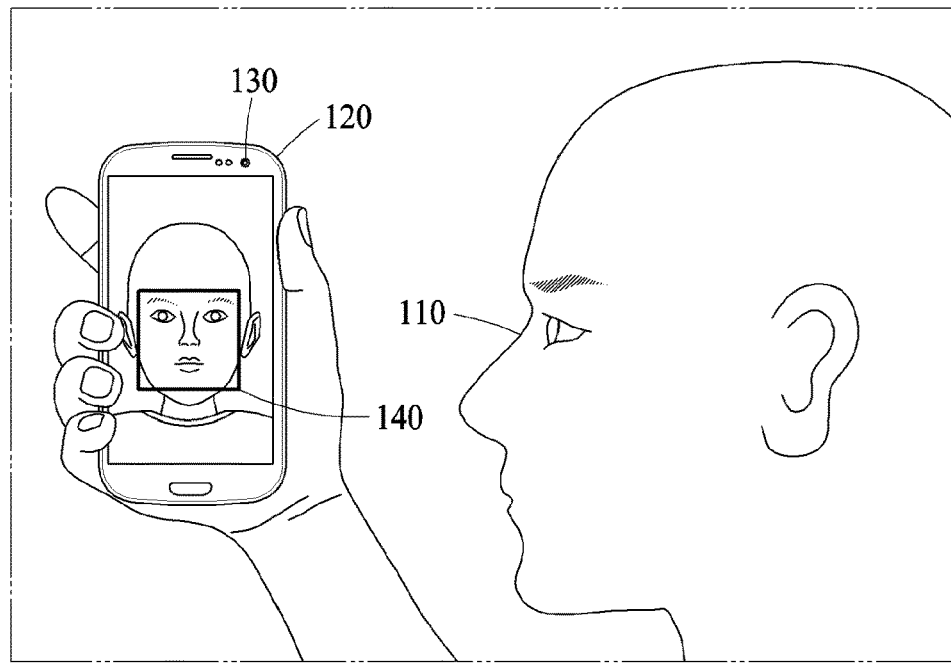
FIGS. 1A and 1B are diagrams illustrating examples of face verification.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

As will become apparent from the following description, this application describes examples of a facial verification method performed by a processor, and a processor-implemented verification apparatus, having an improved performance resulting at least in part from separating a query face image into color channel images of different color channels; obtaining a multi-color channel target face image with a reduced shading of the query face image based on a smoothed image and a gradient image of each of the color channel images; extracting a face feature from the multi-color channel target face image; and determining whether face verification is successful based on the extracted face feature. The face feature may be extracted using a neural network configured to receive image data of the multi-color channel target face image with the reduced shading of the query face image as an input. Obtaining the multi-color channel target face image with the reduced shading of the query face image improves an accuracy of the face verification by minimizing the influence of variations in an illumination environment in which the query face image is obtained, thereby improving an operation of a computer or processor performing the facial verification method.

Figure 1B:
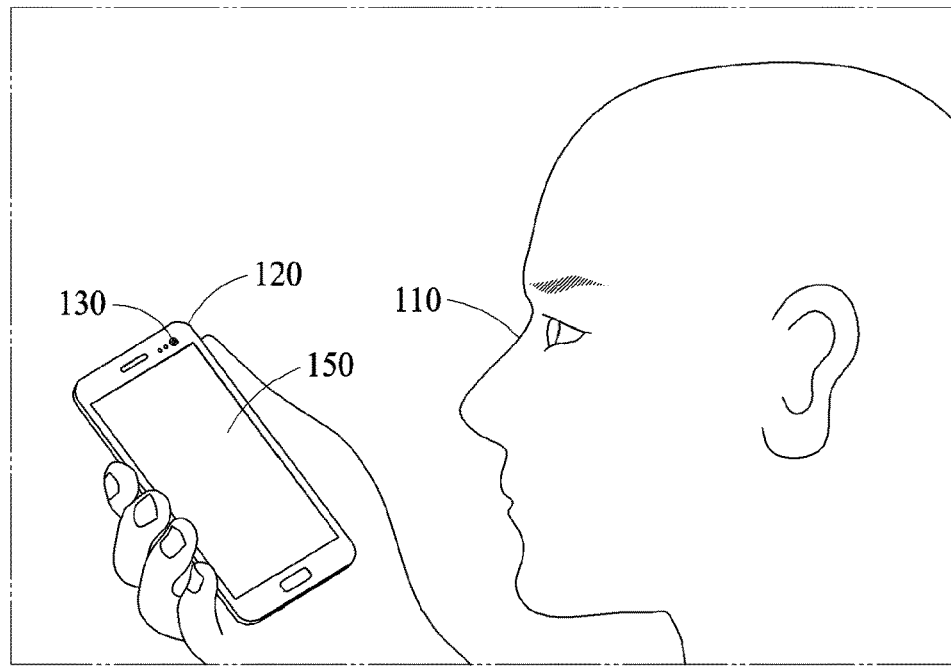

FIGS. 1A and 1B are diagrams illustrating examples of face verification.

Face verification is a verification method used to determine whether a user is a valid user based on face information of the user, and verify a valid user in, for example, user log-in, payment services, and access control. Referring to FIG. 1A, a facial verification apparatus configured to perform such a face verification is included in, or represented by, a computing apparatus 120. Examples of the computing apparatus 120 include a smartphone, a wearable device, a tablet computer, a netbook, a laptop computer, a desktop computer, a personal digital assistant (PDA), a set-top box, a home appliance, a biometrics-based door lock, a security device, and a vehicle start device.

The computing apparatus 120 determines whether a user 110 attempting to gain access to the computing apparatus 120 through face verification is a valid user. For example, in a case in which the user 110 attempts the face verification for user authentication in the computing apparatus 120, e.g., to cancel a lock state of the computing apparatus 120, the computing apparatus 120 obtains a face image of the user 110 using an image acquirer, for example, a camera 130 as illustrated, analyzes the obtained face image, and determines whether to cancel the lock state of the computing apparatus 120 based on a result of the analyzing of the obtained face image.

In one example, the face image captured through the camera 130 by the user 110 for the face verification is acquired through user interaction with a display of the computing apparatus 120, such as when a face image displayed on the display of the computing apparatus 120 functions as a preview image for ultimate capturing of the face image that will be analyzed in a registration and/or verification operation. For example, by referring to the preview image, the user 110 may adjust a positioning of the computing apparatus 120 to capture a particular facial pose to be input for the face verification according to guidance provided by the display through the preview image. In another example, as illustrated in FIG. 1B, a preview image captured by a camera 130 in a facial verification process is not displayed on a display 150 of a computing apparatus 120.

Referring back to FIG. 1A, the computing apparatus 120 detects a face region 140 in the obtained face image, and extracts a feature from the face region 140 using a feature extractor. The computing apparatus 120 determines the user authentication to be a success or a failure based on a result of comparing the extracted feature with a registered feature of a valid user that was registered in a face registration process. The feature extractor is a model implemented in hardware and configured to output feature information, for example, a feature, a feature vector, or a feature map, based on input information. Though not limited thereto, in one example, the feature extractor is a trained neural network that is trained in advance based on training data. In one example, the trained neural network is a single trained neural network, and in another example, the trained neural network is constituted by multiple trained neural networks.

In the above example, in response to the user authentication being determined to be successful, the user 110 is able to successfully cancel a lock mode of the computing apparatus 120. Conversely, in response to the user authentication being determined to be unsuccessful, the computing apparatus 120 is maintained or continues to operate in the lock mode, or the user 110 is not permitted to gain access to a restricted area or perform, for example, financial or payment operations. A valid user registers, in advance, a face of the valid user in the computing apparatus 120 in the face registration process and the computing apparatus 120 stores, in a storage device or a cloud storage, resulting registered information to identify the valid user. For example, a face image of a valid user or a face feature extracted from the face image of the valid user may be stored as registration information of the valid user.

For face verification, different face images will be obtained using the camera 130 depending on an illumination environment, for example, an illumination and an illumination location. For example, a face of a user may not clearly appear in a face image of the user due to a dark environment, an illumination direction, backlight, light leaks, and other illumination characteristics, and thus accuracy of the face verification may decrease. To improve accuracy and usefulness of the face verification, it is desirable to perform the face verification robustly in various illumination environments. Hereinafter, how to perform face verification robustly in various illumination environments will be described with reference to the drawings.

Figure 2:
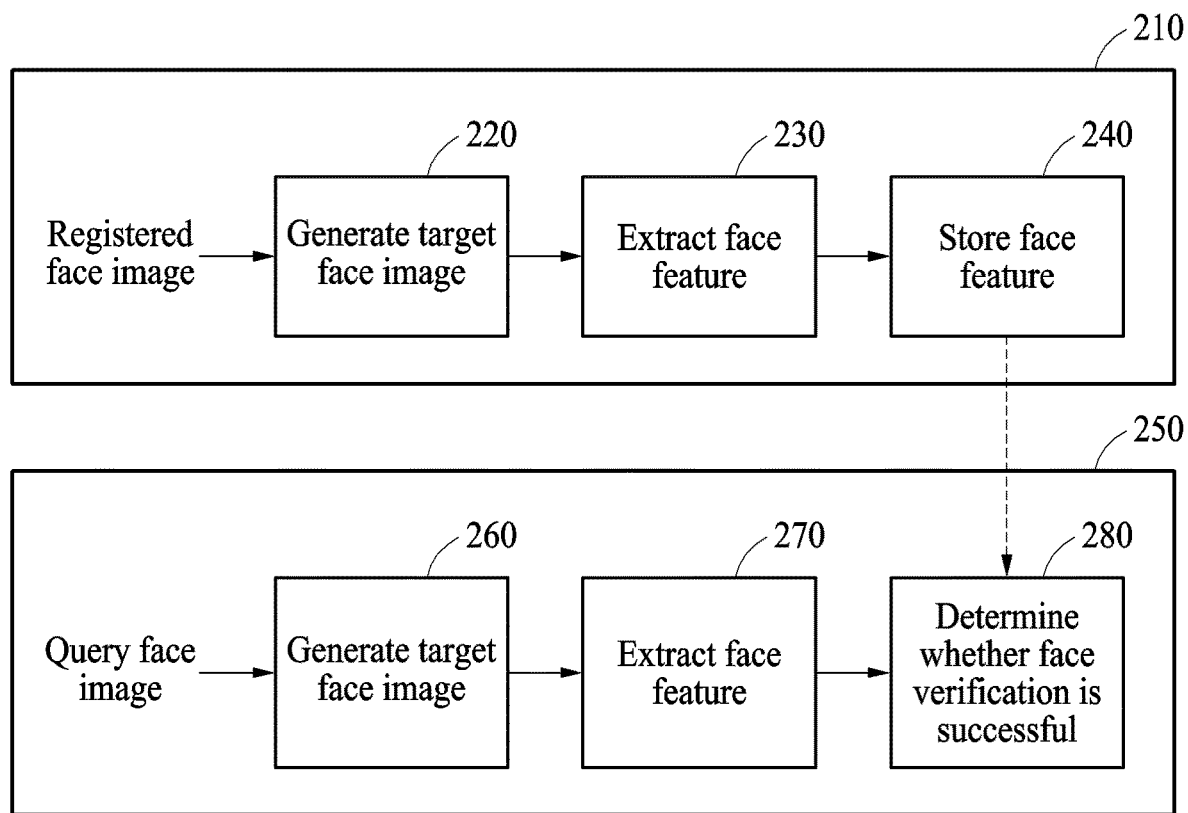
FIG. 2 is a diagram illustrating an example of a face registration process and a facial verification process.

FIG. 2 is a diagram illustrating an example of a face registration process and a facial verification process.

Referring to FIG. 2, in a face registration process 210, a face feature of a valid user that is extracted from a face image of the valid user, which is a target image to be registered in face registration, is registered. In one example, a user captures an image of a face of the user using a camera for face registration, and a face region is detected in the face image obtained using the camera. An image corresponding to the detected face region is used as a registered face image. The face region may be detected using, for example, a Haar-based cascade AdaBoost classifier or a Viola-Jones detector. However, the method of detecting the face region is not limited to these examples, and other methods of detecting the face region may be used. In one example, an image normalization process, for example, image cropping, affine transformation, or image scaling, is performed on the registered face image.

In operation 220, when the registered face image is obtained as discussed above, image processing to be described hereinafter is applied to the registered face image to generate a target face image with a shading reduced from a shading of the registered face image. A shading reduced from a shading of a face image will also be referred to as a reduced shading. In operation 230, a face feature is extracted from the target face image. In operation 240, the extracted face feature is stored as a registered face feature of the user. In one example, the face feature is extracted by a neural network-based feature extractor. Shading in an image is an undesirable variation in either one or both of brightness and color in an image that alters the appearance of an object in the image, such as a face in the image, due to non-uniform illumination, the color of the illumination, non-uniform camera sensitivity, dust and smudges on a camera lens, and other factors. Shading in an image makes it more difficult to recognize a face from the image, so the image processing that is applied in operation 220 reduces the shading in the registered face image when it generates the target face image with the reduced shading to increase an accuracy of a facial verification process.

In a facial verification process 250, whether a user attempting face verification is a valid user is determined. In one example, a user captures an image of a face of the user using a camera, for example, a digital still camera or a video camera, for face verification, and a face region is detected in the image obtained using the camera. An image corresponding to the detected face region is used as a query face image, which is a target image for the face verification. In one example, similarly to the face registration process 210, an image normalization process, for example, image cropping, affine transformation, or image scaling, is performed on the query face image.

In operation 260, when the query face image is obtained as discussed above, image processing to be described hereinafter is applied to the query face image to generate a target face image with a reduced shading of the query face image. The target face image is generated by the image processing, which is the same as the image processing used to generate the target face image in operation 220 in the face registration process 210. Thus, the image processing that is applied in operation 260 reduces the shading in the query face image when it generates the target face image with a shading reduced from the shading of the query face image to increase an accuracy of the facial verification process 250. In operation 270, a face feature is extracted from the target face image by a feature extractor that is the same as the feature extractor used in the face registration process 210. In operation 280, whether the face verification is successful is determined based on a result of comparing the extracted face feature with the registered face feature stored in the face registration process 210. In one example, a similarity between the face feature and the registered face feature is calculated, and the face verification is determined to be successful in response to a score based on the calculated similarity being greater than a threshold value. Conversely, in response to the score being less than or equal to the threshold value, the face verification is determined to be unsuccessful. In another example, a distance, for example, a Euclidean distance, between the face feature and the registered face feature is calculated, and the face verification is determined to be successful in response to the calculated distance being less than or equal to a threshold value. Conversely, in response to the calculated distance being greater than the threshold value, the face verification is determined to be unsuccessful. In the examples described above, the similarity and the distance between the face feature and the registered face feature may be calculated based on a feature vector representing the face feature and a feature vector representing the registered face feature, and the similarity and the distance are inversely proportional. For consistency in description, examples of the determining of a result of face verification based on a similarity will be described hereinafter. However, the examples to be described hereinafter may be changed or extended to other examples of the determining of a result of face verification based on a distance rather than the similarity.

Figure 3:
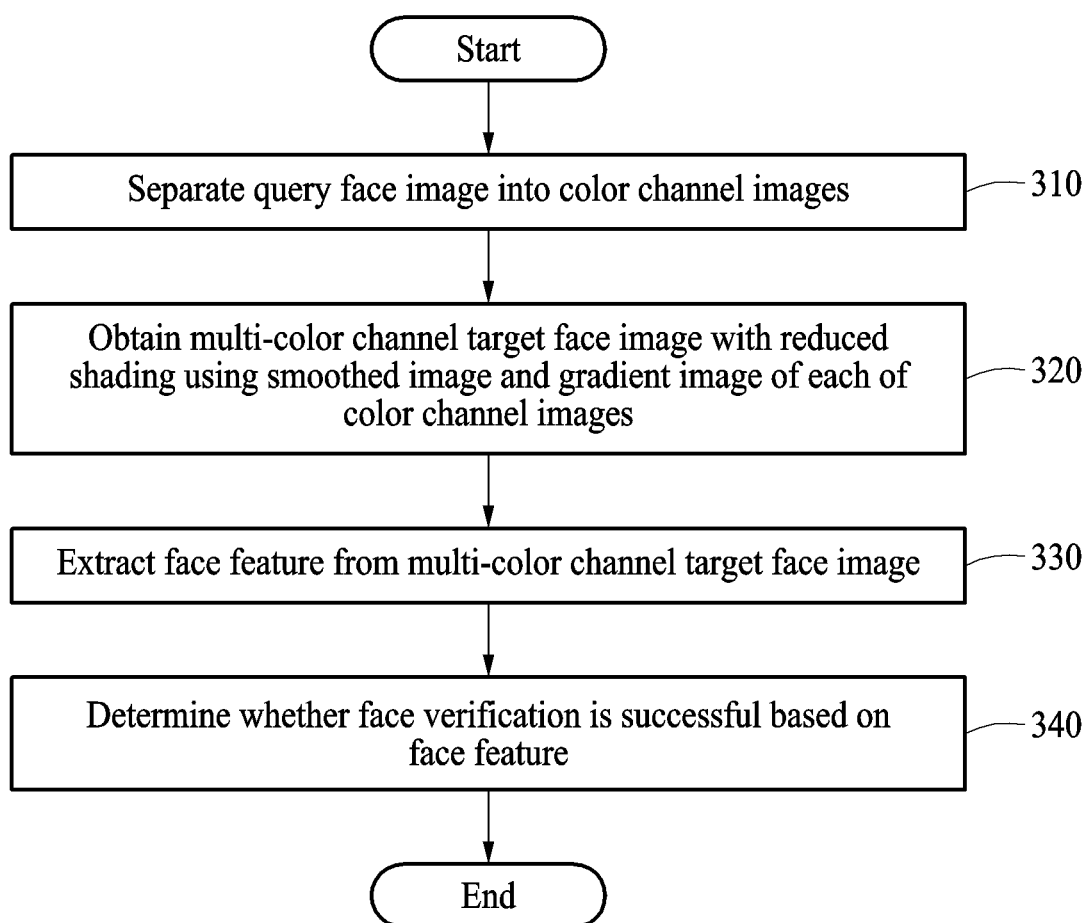
FIG. 3 is a flowchart illustrating an example of a facial verification method.

FIG. 3 is a flowchart illustrating an example of a facial verification method.

Referring to FIG. 3, in operation 310, a facial verification apparatus separates a query face image into color channel images of different color channels. In one example, the facial verification apparatus separates the query face image into color channel images of red, green, and blue (RGB) color channels. That is, the query face image, which is a color image, is separated into RGB color components, and each of the color channel images is an image of a corresponding color component.

The facial verification apparatus may also perform preprocessing on the query face image before separating the query face image into the color channel images. The preprocessing may include at least one operation to process the query face image to be more suitable for face verification. The preprocessing may include, for example, adjusting a size of the query face image, rotating the query face image, removing noise in the query face image, deblurring the query face image, removing a background region from the query face image, performing warping to correct a distortion in the query face image, and cropping a region from the query face image.

In operation 320, the facial verification apparatus obtains a multi-color channel target face image with a reduced shading of the query face image based on a smoothed image and a gradient image of each of the color channel images. The reduced shading is a shading of the multi-color channel target face image that is reduced from a shading of the query face image. The smoothed image is an image with noise reduced by performing smoothing on each of the color channel images, and the gradient image is an image representing a change of pixel values of neighboring pixels of a pixel in each of the color channel images. The gradient image represents a difference between the pixel values of the neighboring pixels and includes edge information of an object.

The facial verification apparatus generates a reconstructed image in which edges are emphasized for each of the different color channels through a normalization process based on the smoothed image and the gradient image of each of the color channel images. The facial verification apparatus generates a target face image corresponding to each of the different color channels by fusing each of the color channel images with the reconstructed image for each of the color channels based on a weight parameter for each of the color channels. The weight parameter for each of the color channels is used to determine a degree of fusion between each of the color channel images and the reconstructed image for each of the color channels. For example, a weight parameter is used to determine how much a corresponding color channel image and a corresponding reconstructed image are reflected in a corresponding target face image. For example, a greater weight parameter causes the color channel image to be more reflected in the target face image than the reconstructed image. Conversely, a smaller weight parameter causes the color channel image to be less reflected in the target face image than the reconstructed image.

In one example, the weight parameter for each of the color channels is a predefined constant. In such an example, a weight parameter having a constant value corresponding to each of the RGB color channels is used. The weight parameter for each of the color channels may be learned or trained in a training process of a feature extractor used for face registration and face verification. In the training process, a loss is calculated based on a difference between a feature extracted by the feature extractor and an intended feature, and the weight parameter for each of the color channels is adjusted, along with parameters configuring the feature extractor, to reduce the calculated loss. The process discussed in the foregoing is repetitively performed on a large amount of training data to gradually adjust the parameters of the feature extractor and the weight parameter for each of the color channels to have desirable values.

In another example, the weight parameter for each of the color channels is not a predefined constant as in the preceding example, but is determined for each of the color channel images. For example, the weight parameter for each of the color channels is determined for each of the color channel images by a neural network receiving image data of the query face image as an input. The neural network determines the weight parameter for each of the color channels based on a result of image quality assessment (IQA) performed on the query face image. The IQA may be performed on the query face image by calculating any of various metrics for the query face image, such as a Spearman's rank-order correlation coefficient (SROCC), a linear correlation coefficient (LCC), a root-mean-squared error (RMSE), or an outliers ratio (OR), but the IQA is not limited thereto.

In another example, the weight parameter for each of the color channels is determined for each pixel location in each of the color channel images. For example, the weight parameter may be determined individually for each pixel location in each of the color channel images by a neural network receiving image data of the query face image as an input.

In another example, in a case in which the weight parameter for each of the color channels is not fixed, but is determined based on each of the color channel images, how much a color channel image including original image data and a corresponding reconstructed image obtained by performing a series of image processing operations are reflected in a corresponding target face image is adaptively determined based on a condition of the color channel image. In one example, in a case in which the query face image is captured in a desirable illumination environment, the weight parameter for each of the color channels is determined so that the color channel image including the original image data is relatively more reflected in the target face image. Conversely, in a case in which the query face image is captured in a low-illumination environment or an undesirable illumination environment including, for example, backlight, light leaks, and other undesirable illumination conditions, the weight parameter for each of the color channels is determined so that the reconstructed image generated by performing the series of image processing operations is relatively more reflected in the target face image. As discussed above, adaptively determining the weight parameter for each of the color channels based on a condition of the color channel images or the query face image enables face verification to be robust in such an undesirable illumination environment.

After the target face images respectively corresponding to the different color channels are generated, the multi-color channel target face image is obtained by combining the target face images. For example, through the combining, a multi-color channel target face image having the RGB color components is obtained. How such a target face image is generated will be described in greater detail with reference to FIG. 4.

In operation 330, the facial verification apparatus extracts a face feature from the multi-color channel target face image obtained in operation 320. In one example, the facial verification apparatus extracts a face feature using a feature extractor based on a neural network receiving image data of a target face image as an input. The feature extractor extracts, as a face feature, a feature value corresponding to the input image data. The feature extractor is trained based on training data before a facial verification process.

In operation 340, the facial verification apparatus determines whether face verification is successful based on the face feature extracted in operation 330. The facial verification apparatus compares the extracted face feature with a face feature registered or stored in a face registration process, and determines whether the face verification is successful based on a result of the comparing. For example, the facial verification apparatus determines a similarity between the extracted face feature and the registered face feature, determines the face verification to be successful in response to the similarity being greater than a threshold value, and determines the face verification to be unsuccessful in response to the similarity being less than or equal to the threshold value. The similarity decreases as a difference between the extracted face feature and the registered face feature increases, and increases as the difference decreases.

As discussed above, the facial verification apparatus separates a query face image into respective color channel images of different color channels, performs image processing, generates a target face image with a reduced shading, and performs face verification based on the target face image. Thus, face verification that is robust in various illumination environments is enabled and accuracy of the face verification is improved Further, performance of the face verification is improved by using a multi-color channel target face image, thereby applying a feature, such as, for example, a skin color, to the face verification.

Figure 4:
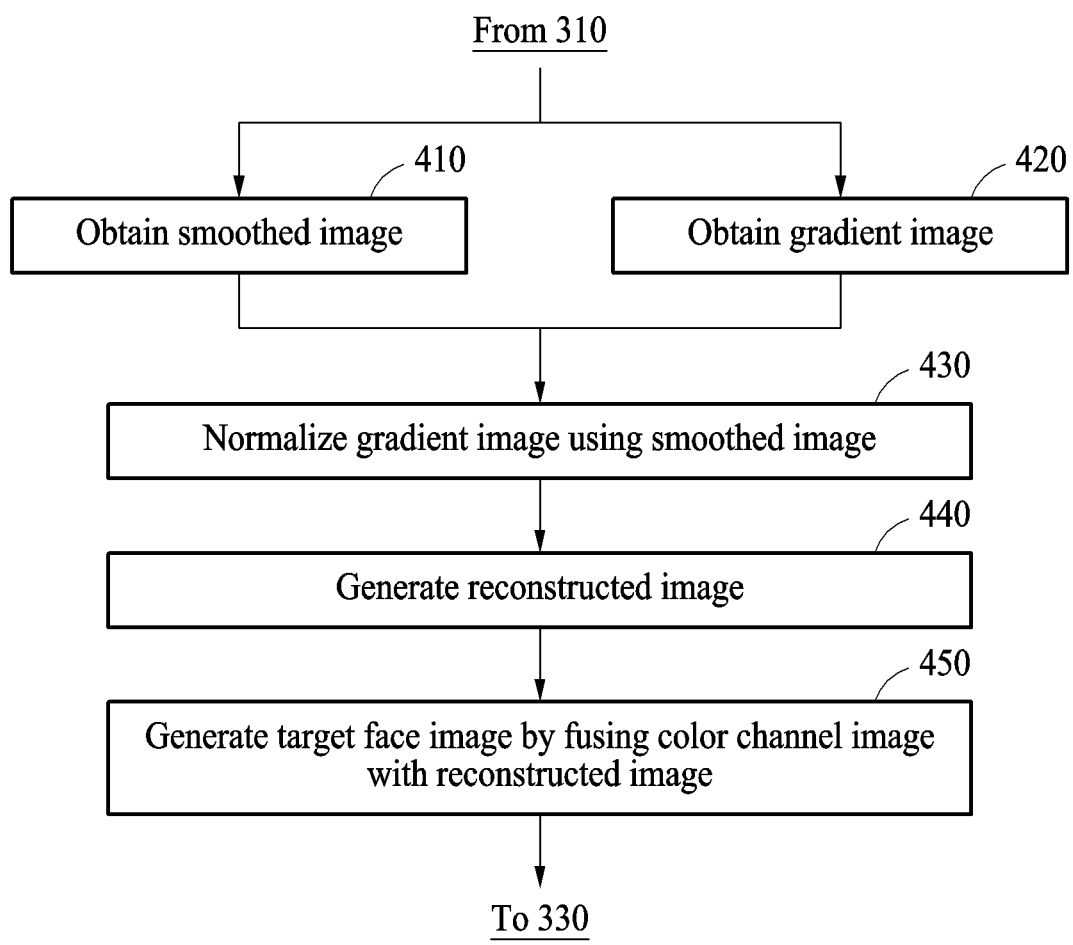
FIG. 4 is a flowchart illustrating an example of a method of obtaining a target face image for each color channel.

FIG. 4 is a flowchart illustrating an example of a method of obtaining a target face image for each color channel.

Referring to FIG. 4, in operation 410, a facial verification apparatus obtains a smoothed image by performing smoothing on a current color channel image. For example, the facial verification apparatus obtains the smoothed image by performing the smoothing on the color channel image using a filter configured to filter noise out. In operation 420, the facial verification apparatus obtains a first gradient image in a horizontal direction or an x-axis direction, and a second gradient image in a vertical direction or a y-axis direction, from the color channel image. The facial verification apparatus obtains the first gradient image by calculating pixel value differences between neighboring pixels in the horizontal direction and presenting the pixel value differences in a form of a map. Similarly, the facial verification apparatus obtains the second gradient image by calculating pixel value differences between neighboring pixels in the vertical direction and presenting the pixel value differences in a form of a map.

In operation 430, the facial verification apparatus normalizes each of the first gradient image and the second gradient image based on the smoothed image. For example, the facial verification apparatus obtains a normalized first gradient image and a normalized second gradient image by dividing the first gradient image and the second gradient image by the smoothed image. The normalizing reduces an influence of an illumination and a color of the illumination, that is, reduces a shading, and thus performance of face verification is improved.

In operation 440, the facial verification apparatus generates a reconstructed image corresponding to the color channel image by combining the normalized first gradient image and the normalized second gradient image. In operation 450, the facial verification apparatus generates a target face image corresponding to the color channel image by fusing the color channel image with the reconstructed image based on a weight parameter.

The facial verification apparatus generates respective a target face image corresponding to each of the color channel images by performing operations 410 through 450 on each of the color channel images. In one example, generating of the respective target face images corresponding to the color channel images is performed in parallel.

Figure 5:
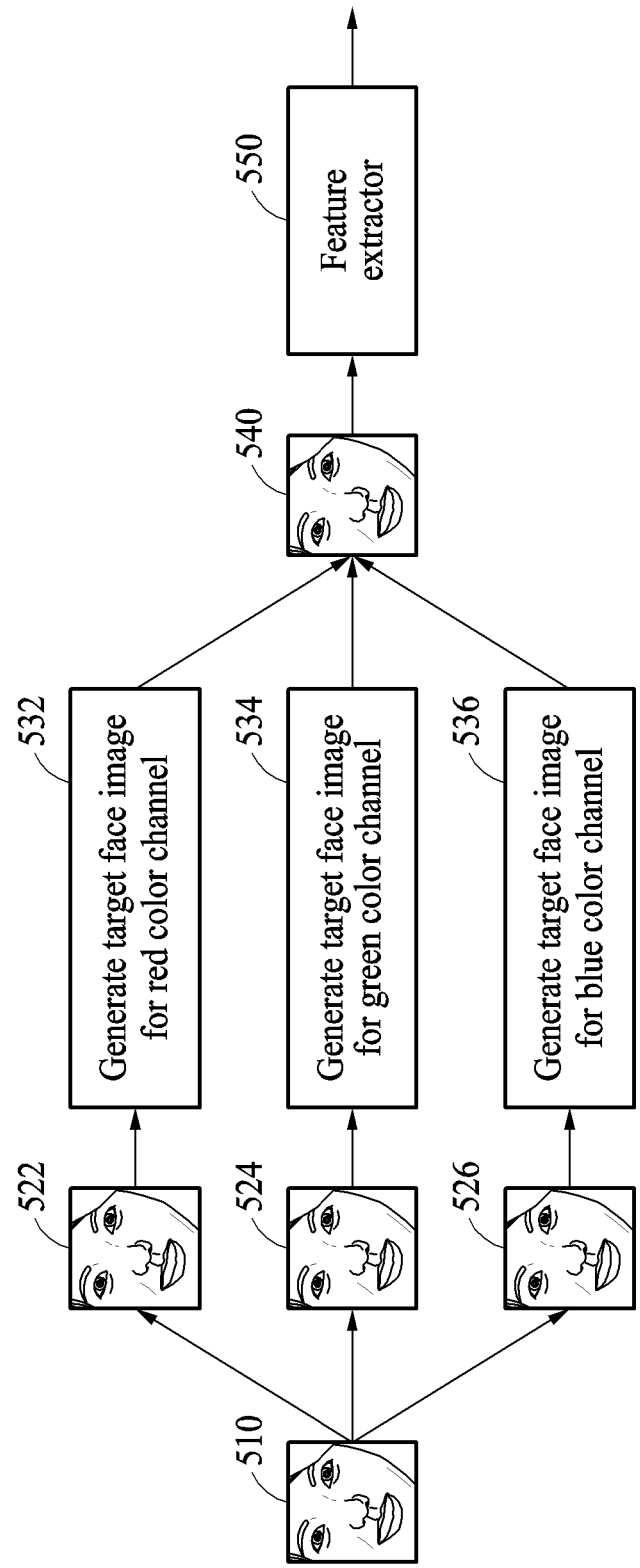
FIG. 5 is a diagram illustrating an example of a method of generating a target face image.

FIG. 5 is a diagram illustrating an example of a method of generating a target face image.

Referring to FIG. 5, a facial verification apparatus separates a query face image 510 into a color channel image 522 of a red color channel, a color channel image 524 of a green color channel, and a color channel image 526 of a blue color channel. Subsequently, in operation 532, the facial verification apparatus generates a target face image for the red color channel based on a weight parameter corresponding to the red color channel according to the operations described above with reference to FIG. 4. Similarly, in operations 534 and 536, the facial verification apparatus generates respective target face images for the green color channel and the blue color channel based on weight parameters respectively corresponding to the green color channel and the blue color channel. The facial verification apparatus then combines the respective target face images for the red, green, and blue color channels to generate a multi-color channel target face image 540 with a reduced shading of the query face image, and image data of the multi-color channel target face image 540 is input to a neural network-based feature extractor 550. The feature extractor 550 extracts a face feature, for example, a feature vector, from the multi-color channel target face image 540 based on the input image data.

In the illustrated example, a weight parameter is a predefined constant, and the weight parameters respectively corresponding to the color channels may differ from one another for each of the color channels. The weight parameters are learned and determined for each of the color channels in a training process. In the training process, the weight parameters are determined so that the feature extractor 550 is robust in various illumination environments. The determined weight parameters are used in both a face registration process and a facial verification process.

According to the example discussed above, a skin color of a face in a query face image that changes due to various illumination environments is corrected, and the query face image is also be corrected for each of color channels of the skin color to be more suitable for face verification. Thus, accuracy of the face verification is improved.

Figure 6:
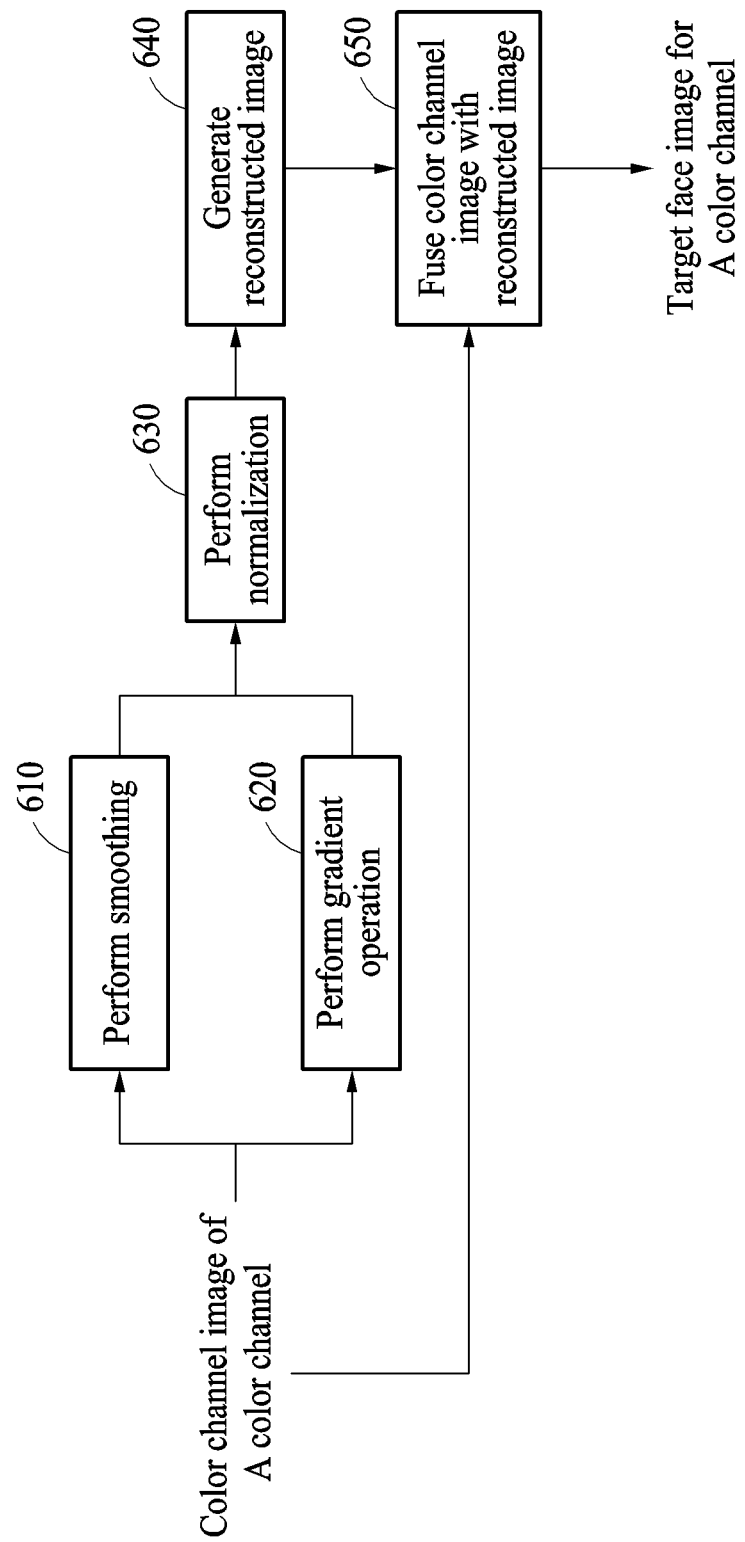
FIG. 6 is a diagram illustrating an example of a method of generating a target face image for a color channel.

FIG. 6 is a diagram illustrating an example of a method of generating a target face image for a color channel.

Referring to FIG. 6, in operation 610, a facial verification apparatus generates a smoothed image by performing smoothing on a color channel image of an A color channel. In one example, the smoothed image is generated according to Equation 1 below.

$$\hat{W} = X * K \quad (1)$$

In Equation 1, X denotes the color channel image of the A color channel, K denotes a smoothing kernel for the smoothing, * denotes a convolution operation, and $\hat{W}$ denotes the smoothed image. Assuming a Lambertian reflection model, the color channel image X is represented by Equation 2 below.

$$X(i,j) = \rho(i,j) n_{(i,j)}^T \cdot s \quad (2)$$

In Equation 2, p(I,j) denotes a surface texture associated with a location (I,j) in the color channel image, n(I,j) denotes a surface normal direction associated with the location (I,j) in the color channel image, S denotes a direction of an illumination or a light source, · denotes a vector dot product, and T denotes a vector transposition. In a case in which a plurality of light sources $S_i$ are present, Equation 2 is extended to Equation 3 below.

$$X = \rho \sum_i n^T \cdot s_i \quad (3)$$

In Equation 3, I denotes an index used to distinguish the light sources $S_i$.

In operation 620, the facial verification apparatus generates a gradient image by performing a gradient operation on the color channel image X of the A color channel. In one example, the gradient operation is performed according to Equation 4 below.

$$\nabla X = \nabla \left( \rho \sum_i n^T \cdot s_i \right) \quad (4)$$

$$= (\nabla \rho) \sum_i n^T \cdot s_i + \rho \nabla \left( \sum_i n^T \cdot s_i \right)$$

$$\approx (\nabla \rho) \sum_i n^T \cdot s_i = (\nabla \rho) W$$

In Equation 4, an approximation relationship is derived based an assumption that a surface normal direction n and an illumination direction $S_i$ change relatively slowly throughout an entire region of the color channel image, whereas a surface texture p changes relatively quickly.

The facial verification apparatus generates a first gradient image based on a pixel value difference in a horizontal direction between neighboring pixels in the color channel image, and a second gradient image based on a pixel value difference in a vertical direction between neighboring pixels in the color channel image. In one example, the first gradient image and the second gradient image $\nabla\chi=\{\partial\chi/\partial x, \partial\chi/\partial y\}$ are generated according to Equation 4 above.

In operation 630, the facial verification apparatus normalizes each of the first gradient image and the second gradient image based on the smoothed image. In one example, the normalizing is performed by dividing the first gradient image and the second gradient image by the smoothed image according to Equation 5 below.

$$N = \frac{\nabla \chi}{\hat{W}} \approx \frac{(\nabla \rho) W}{\hat{W}} \approx \nabla \rho \qquad (5)$$

In Equation 5, N is {Nx, Ny}, and includes the normalized first gradient image Nx and the normalized second gradient image Ny.

In operation 640, the facial verification apparatus generates a reconstructed image Xr by combining the normalized first gradient image and the normalized second gradient image.

In operation 650, the facial verification apparatus fuses the color channel image of the A color channel with the reconstructed image based on a weight parameter α corresponding to the A color channel. Through the fusing, a target face image for the A color channel is generated. In one example, the fusing is performed according to Equation 6 below.

$$\chi_{IN}=\alpha\chi_r+(1-\alpha)\chi \qquad (6)$$

In Equation 6, $X_{IN}$ denotes the target face image for the A color channel, and a range of the weight parameter α is 0≤α≤1.

The facial verification apparatus performs the operations discussed in the foregoing on each of the color channel images of different color channels, and generates target face images respectively corresponding to the different color channels.

Figure 7:
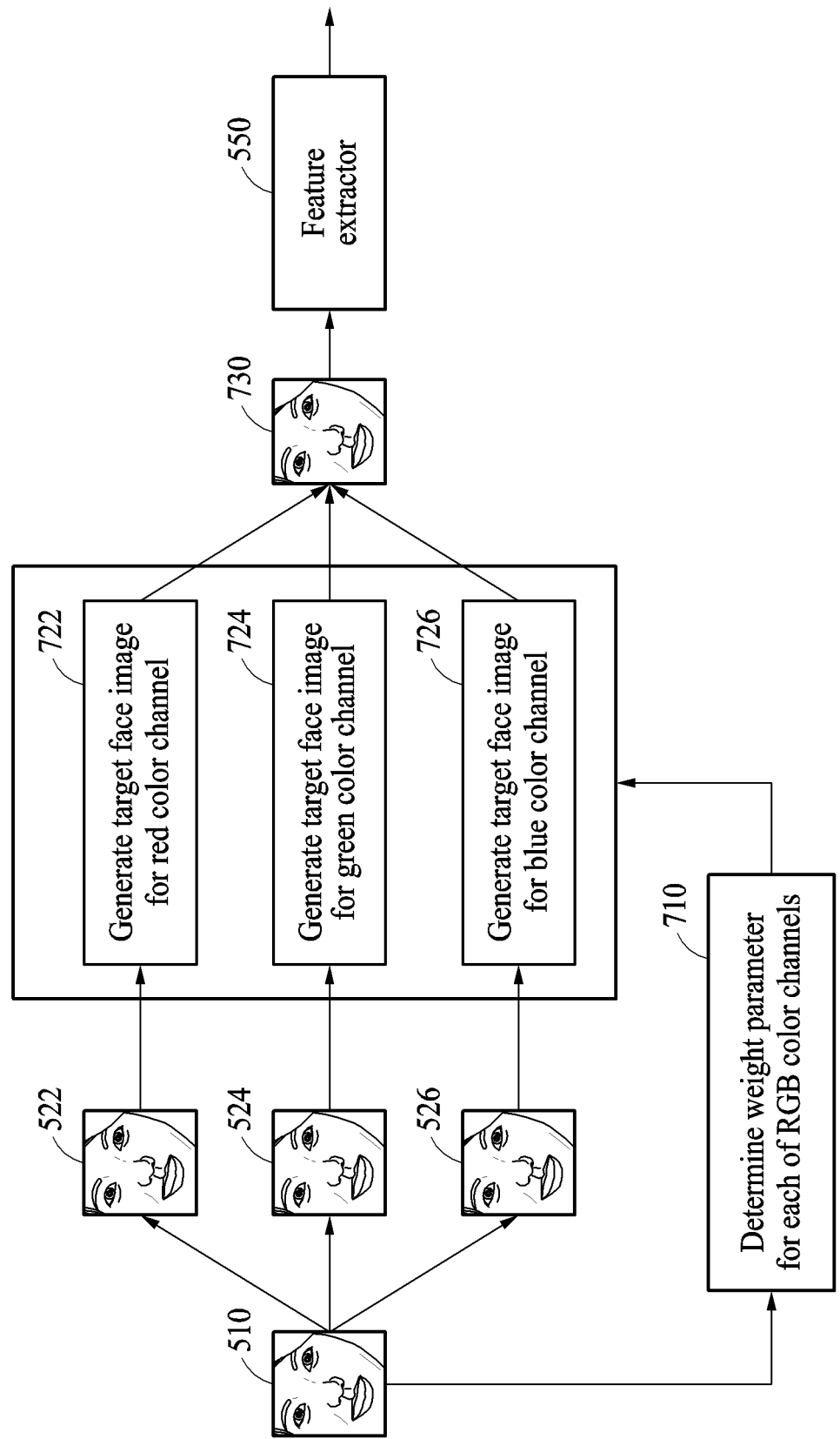
FIG. 7 is a diagram illustrating another example of a method of generating a target face image.

FIG. 7 is a diagram illustrating another example of a method of generating a target face image.

Referring to FIG. 7, similarly to the example illustrated in FIG. 5, a facial verification apparatus separates a query face image 510 into a color channel image 522 of a red color channel, a color channel image 524 of a green color channel, and a color channel image 526 of a blue color channel. However, in contrast to the example discussed above with reference to FIG. 5, the facial verification apparatus adaptively determines a weight parameter based on a condition of the query face image 510 to generate a target face image of each of the color channel images. In operation 710, a weight parameter corresponding to each of the RGB color channels is determined. The facial verification apparatus generates target face images respectively corresponding to the RGB color channels based on the weight parameter determined as discussed above in respective operations 722, 724, and 726, and generates a multi-color channel target face image 730 with a reduced shading of the query face image 510 by combining the target face images corresponding to the RGB color channels. Subsequently, a feature extractor 550 extracts a face feature from the multi-color channel target face image 730.

In one example, a weight parameter is determined by a weight parameter determiner based on a neural network receiving image data of the query face image 510 as an input, and parameters configuring the weight parameter determiner are optimized through a training process. In the training process, the weight parameter determiner is trained to output a desirable value of a weight parameter for each color channel based on a result of IQA performed on training images input to the weight parameter determiner. In the example illustrated in FIG. 7, the weight parameter determiner outputs the weight parameter for each color channel in operation 710 based on a result of IQA performed on the query face image 510 in face verification. The IQA may be performed on the training images and the query face image 510 by calculating any of various metrics for the training images and the query face image 510, such as a Spearman's rank-order correlation coefficient (SROCC), a linear correlation coefficient (LCC), a root-mean-squared error (RMSE), or an outliers ratio (OR), but the IQA is not limited thereto. According to such an example, by determining a weight parameter for each color channel based on a condition of a query face image, a difference between the query face image captured in a normal illumination environment and the query face image captured in other various illumination environments is reduced, and thus face verification is performed robustly despite an illumination change.

Figure 8:
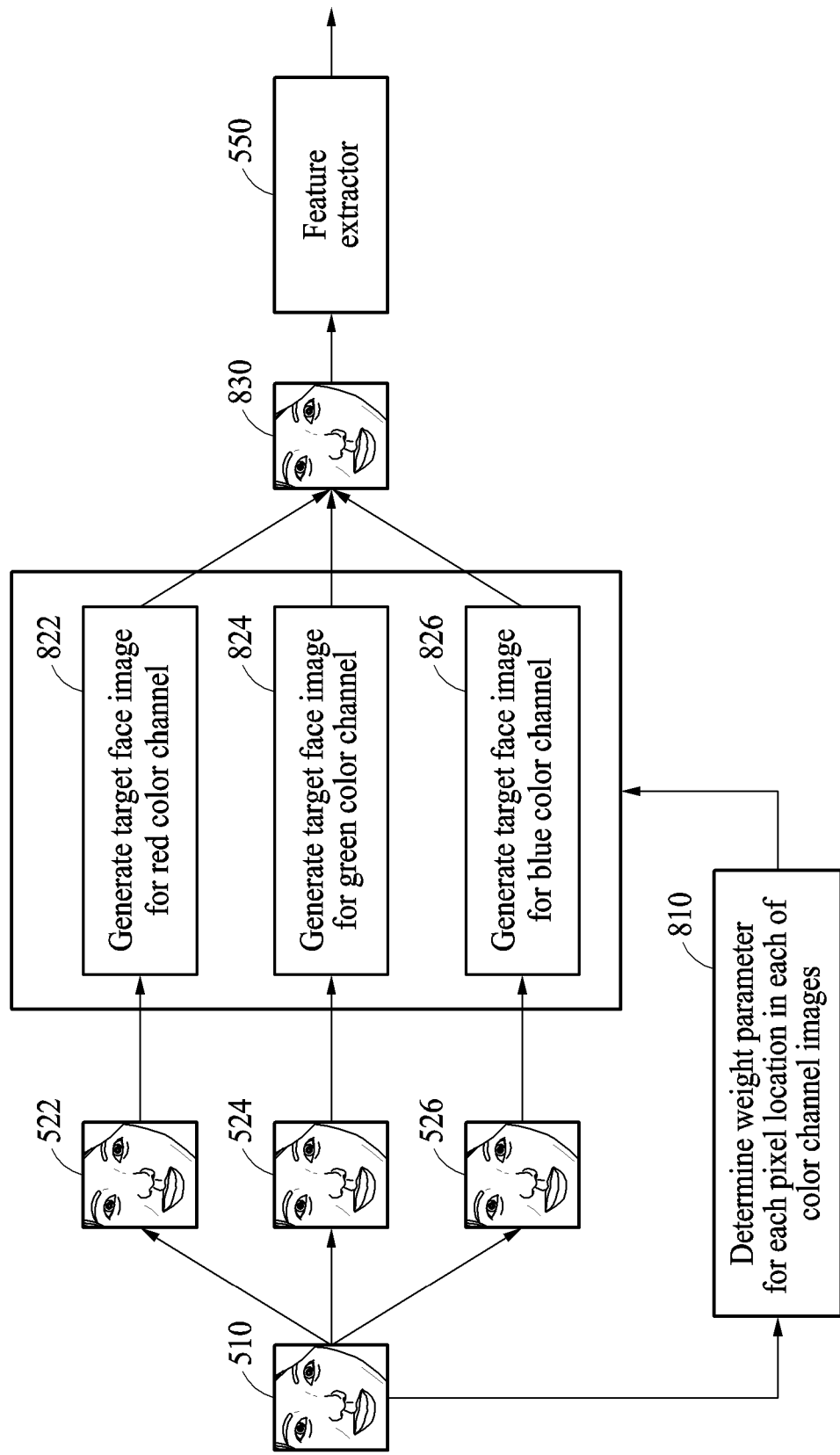
FIG. 8 is a diagram illustrating another example of a method of generating a target face image.

FIG. 8 is a diagram illustrating another example of a method of generating a target face image.

Referring to FIG. 8, similarly to the example illustrated in FIG. 7, a facial verification apparatus separates a query face image 510 into a color channel image 522 of a red color channel, a color channel image 524 of a green color channel, and a color channel image 526 of a blue color channel, and determines a weight parameter for each of the color channels. However, in contrast to the example discussed above with reference to FIG. 7, the facial verification apparatus determines the weight parameter for each pixel location in each of the color channel images, rather than for an entire color channel image as in the example of FIG. 7, in operation 810. The facial verification apparatus generates target face images respectively corresponding to the RGB color channels based on the weight parameter determined for each pixel location in respective operations 822, 824, and 826, and generates a multi-color channel target face image 830 by combining the target face images. Subsequently, a feature extractor 550 extracts a face feature from the multi-color channel target face image 830.

In one example, similarly to the example discussed above with reference to FIG. 7, the weight parameter is determined by a weight parameter determiner based on a neural network receiving image data of the query face image 510 as an input. The weight parameter determiner is trained to output a desirable value of a weight parameter for each pixel location in each of the color channel images based on a result of IQA performed on training images input to the weight parameter determiner.

In the example illustrated in FIG. 8, by using such a weight parameter determined for each pixel location, a local illumination change in a pixel unit, for example, a directional light and a partial shadow that may appear in the query face image 510, is corrected, and thus face verification is performed robustly in various illumination environments. In one example, when generating a target face image, the weight parameter is determined so that the query face image 510 including original image data is relatively less reflected in the target face image and a reconstructed image obtained by performing image processing is more reflected in the target face image for a region in which a directional light occurs.

Figure 9:
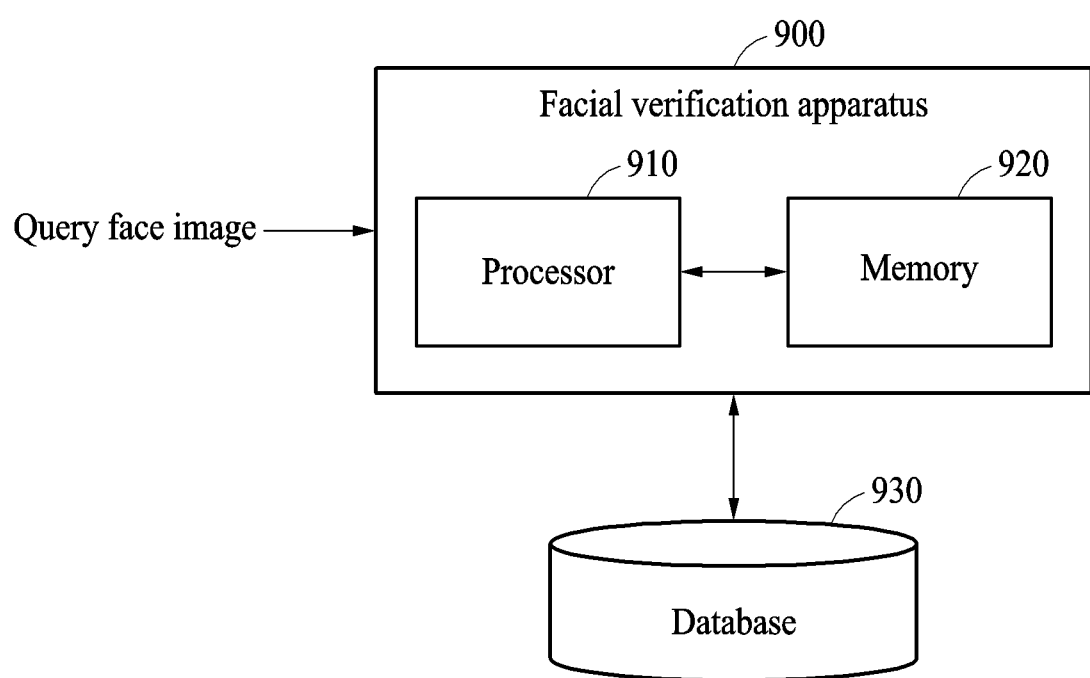
FIG. 9 is a diagram illustrating an example of a facial verification apparatus.

FIG. 9 is a diagram illustrating an example of a facial verification apparatus. A facial verification apparatus 900 is configured to perform any one or any combination of any two or more of the operations described above with reference to FIGS. 1A through 8.

Referring to FIG. 9, the facial verification apparatus 900 receives a query face image for face verification. The facial verification apparatus 900 determines whether the face verification is successful based on a result of comparing a face feature extracted from the query face image with a registered face feature stored in a database 930. A valid user registers a face of the valid user in advance to store a feature or an image of the face of the valid user in any of the face registration processes described in this application. Such registered information associated with the registered face feature is stored in the database 930. The facial verification apparatus 900 performs any one or any combination of any two or more of the operations described above with reference to FIGS. 1A through 8, and provides a user with a result of the face verification.

The facial verification apparatus 900 includes at least one processor 910 and a memory 920. The processor 920 is configured to execute instructions to perform any one or any combination of any two or more of the operations described above with reference to FIGS. 1A through 8.

In one example, the processor 910 is configured to separate a query face image of a user into color channel images of different color channels, and obtain a target face image corresponding to each of the different color channels based on a smoothed image and a gradient image of each of the color channel images.

The processor 910 is further configured to generate a reconstructed image in which edges are emphasized for each of the different color channels based on the smoothed image and the gradient image of each of the color channel images, and generate a target face image corresponding to each of the different color channels by fusing each of the color channel images with the reconstructed image based on a weight parameter for each of the color channels. In one example, the weight parameter for each of the color channels is a constant, and may be the same or different for each of the color channels. In another example, the weight parameter is adaptively determined for each of the color channel images. In another example, the weight parameter is determined for each pixel location in each of the color channel images.

The processor 910 is further configured to obtain a multi-color channel target face image by combining the target face images respectively corresponding to the different color channels, and extract a face feature of the user from the multi-color channel target face image.

The processor 910 is further configured to calculate a similarity between the extracted face feature and the registered face feature, determine the face verification to be successful in response to a score based on the similarity being greater than a threshold value, and determine the face verification to be unsuccessful in response to the score being less than or equal to the threshold value.

The memory 920 is a non-transitory computer-readable medium or device connected to the processor 910, and stores instructions that, when executed by the processor 910, cause the processor 910 to perform any one or any combination of any two or more of the operations described above with reference to FIGS. 1A through 9. The memory 920 also stores data to be processed by the processor 910 and data that has already been processed by the processor 910. In one example, memory 920 includes either one or both of a high-speed random access memory (RAM) and a nonvolatile computer-readable storage medium.

Figure 10:
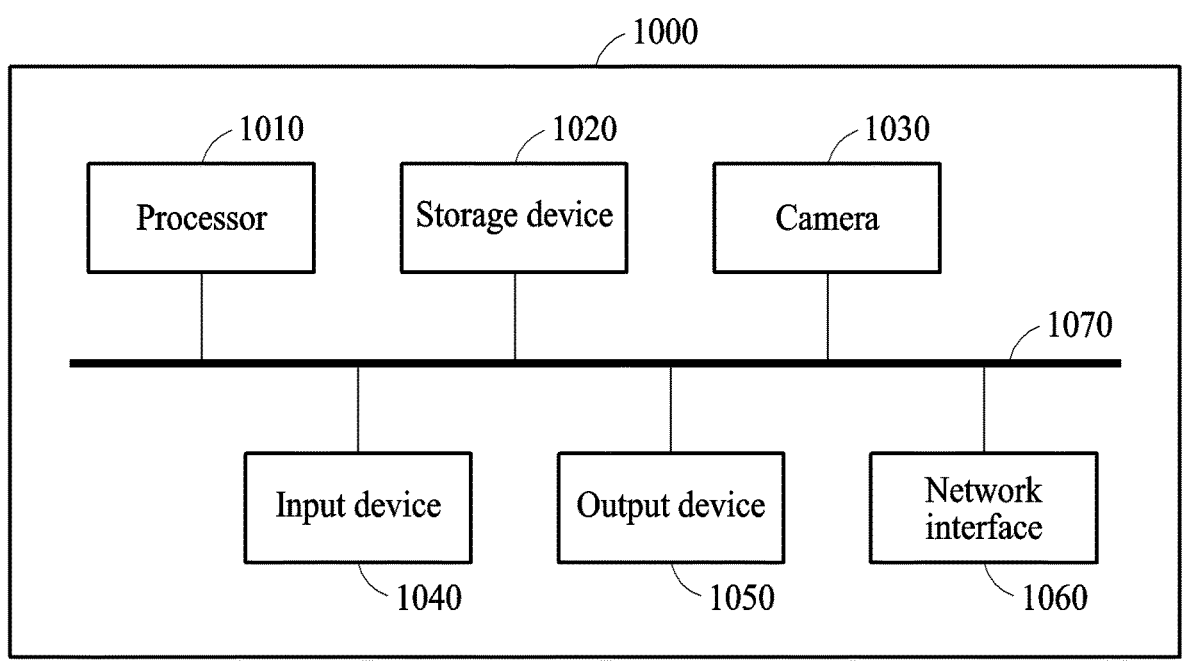
FIG. 10 is a diagram illustrating an example of a computing apparatus.

FIG. 10 is a diagram illustrating an example of a computing apparatus.

Referring to FIG. 10, a computing apparatus 1000 performs a facial verification process by obtaining a query face image including a face of a user, and comparing a face feature extracted from the obtained query face image with a registered face feature. The computing apparatus 1000 corresponds to the computing apparatus 120 illustrated in FIGS. 1A and 1B and the facial verification apparatus 900 illustrated in FIG. 9 in terms of functionality, but is not limited thereto.

The computing apparatus 1000 includes a processor 1010, a storage device 1020, a camera 1030, an input device 1040, an output device 1050, a network interface 1060, and a communication bus 1070. The processor 1010, the storage device 1020, the camera 1030, the input device 1040, the output device 1050, and the network interface 1060 communicate with one another through the communication bus 1070.

The computing apparatus 1000 runs software and applications. The processor 1010 executes instructions to perform the functions of the software and the applications. For example, the processor 1010 is configured to execute instructions stored in the storage device 1020 to perform any one or any combination of any two or more of the operations described above with reference to FIGS. 1A through 9.

The storage device 1020 is a non-transitory computer-readable medium or device. The storage device 1020 stores the instructions that are executed by the processor 1010 to enable the computing apparatus 1000 to run the software and the applications. For example, the storage device 1020 stores the instructions that, when executed by the processor 1010, cause the processor 1010 to perform any one or any combination of any two or more of the operations described above with reference to FIGS. 1A through 9. The storage device 1020 also stores data to be processed and data that has already been processed by the software and the applications being run by the computing apparatus 1000. For example, the storage device 1020 also stores data to be processed by the processor 1010 and data that has already been processed by the processor 1010. The storage device 1020 also stores information to be used for face verification. For example, the storage device 1020 stores registration information, for example, a registered face feature, obtained in a face registration process.

The camera 1030 captures a still image, a video image, or both. The processor 1010 controls the camera 1030 to obtain or capture the query face image, e.g., including a face region, of the user by capturing an image of the face region of the user attempting the face verification.

The input device 1040 receives an input from the user through tactile, video, audio, or touch input. Examples of the input device 1040 include a keyboard, a mouse, a touchscreen, a microphone, and other devices configured to detect the input from the user and transmit the detected input to the processor 1010 through the communication bus 1070.

The output device 1050 provides the user with an output of the computing apparatus 1000 through a visual, auditory, or tactile channel. Examples of the output device 1050 include a display, a touchscreen, a speaker, a vibration generator, and other devices configured to provide the output to the user.

The network interface 1060 communicates with an external device through a wired or wireless network.

The computing apparatus 120 in FIGS. 1A and 1B, the facial verification apparatus 900, the processor 910, the memory 920, and the database 930 in FIG. 9 and the computing apparatus 1000, the processor 1010, the storage device 1020, the camera 1030, the input device 1040, the output device 1050, the network interface 1060, and the communication bus 1070 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A to 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A facial verification method comprising:
separating a query face image into color channel images of different color channels;
obtaining a multi-color channel target face image from each of the color channel images;
extracting a face feature from the multi-color channel target face image; and
determining whether face verification is successful based on the extracted face feature.

2. The facial verification method of claim 1, wherein the obtaining of the multi-color channel target face image comprises:
obtaining a target face image corresponding to each of the color channels based on a smoothed image and a gradient image of each of the color channel images; and
obtaining the multi-color channel target face image by combining the target face images respectively corresponding to the color channels.

3. The facial verification method of claim 2, wherein the obtaining of the target face image corresponding to each of the color channels comprises:
generating a reconstructed image in which an edge is emphasized for each of the color channels based on the smoothed image and the gradient image of each of the color channel images; and
generating the target face image corresponding to each of the color channels by fusing each of the color channel images with the reconstructed image for each of the color channels based on a weight parameter for each of the color channels.

4. The facial verification method of claim 3, wherein the weight parameter for each of the color channels determines a degree of fusion between each of the color channel images and the reconstructed image for each of the color channels.

5. The facial verification method of claim 3, wherein the weight parameter for each of the color channels is a predefined constant.

6. The facial verification method of claim 3, wherein the weight parameter for each of the color channels is determined based on a result of image quality assessment (IQA) performed on the query face image.

7. The facial verification method of claim 3, wherein the weight parameter for each of the color channels is determined for each of the color channel images by a neural network configured to receive image data of the query face image as an input.

8. The facial verification method of claim 3, wherein the weight parameter for each of the color channels is determined for each pixel location in each of the color channel images by a neural network configured to receive image data of the query face image as an input.

9. The facial verification method of claim 3, wherein the generating of the reconstructed image comprises:
obtaining the smoothed image of each of the color channel images by performing smoothing on each of the color channel images;
obtaining a first gradient image of each of the color channel images in a horizontal direction and a second gradient image of each of the color channel images in a vertical direction from each of the color channel images;
normalizing each of the first gradient image and the second gradient image based on the smoothed image; and
generating the reconstructed image corresponding to each of the color channel images based on the normalized first gradient image and the normalized second gradient image.

10. The facial verification method of claim 1, wherein the extracting comprises extracting the face feature using a neural network configured to receive image data of the multi-color channel target face image with reduced shading of the query face image as an input.

11. The facial verification method of claim 1, wherein the separating comprises separating the query face image into color channel images of red, green, and blue (RGB) color channels.

12. A non-transitory computer-readable medium storing instructions that, when executed by a processor, cause the processor to perform the facial verification method of claim 1.

13. A facial verification apparatus comprising:
a processor configured to:
separate a query face image of a user into color channel images of different color channels;
obtain a multi-color channel target face image from each of the color channel images;
extract a face feature of the user from the multi-color channel target face image; and
determine whether face verification is successful based on the extracted face feature.

14. The facial verification apparatus of claim 13, wherein the processor is further configured to:
obtain a target face image corresponding to each of the color channels based on a smoothed image and a gradient image of each of the color channel images; and
obtain the multi-color channel target face image by combining the target face images respectively corresponding to the color channels.

15. The facial verification apparatus of claim 14, wherein the processor is further configured to:
generate a reconstructed image in which an edge is emphasized for each of the color channels based on the smoothed image and the gradient image of each of the color channel images; and
generate the target face image corresponding to each of the color channels by fusing each of the color channel images with the reconstructed image for each of the color channels based on a weight parameter for each of the color channels.

16. The facial verification apparatus of claim 15, wherein the weight parameter for each of the color channels is a predefined constant.

17. The facial verification apparatus of claim 15, wherein the weight parameter for each of the color channels is determined for each of the color channels by a neural network configured to receive image data of the query face image as an input.

18. The facial verification apparatus of claim 15, wherein the weight parameter for each of the color channels is determined for each pixel location in each of the color channel images by a neural network configured to receive image data of the query face image as an input.

* * * * *